(No Model.)

H. P. PRUIM.
NUT LOCK.

No. 386,351. Patented July 17, 1888.

WITNESSES:
Phil C. Dieterich.
C. Sedgwick.

INVENTOR:
H. P. Pruim
BY Munn & Co.
ATTORNEYS.

UNITED STATES PATENT OFFICE.

HIRAM P. PRUIM, OF GRAND HAVEN, ASSIGNOR OF ONE-HALF TO SHERMAN H. BOYCE, NELSON R. HOWLET, AND STEPHEN L. MONRO, OF OTTAWA COUNTY, MICHIGAN.

NUT-LOCK.

SPECIFICATION forming part of Letters Patent No. 386,351, dated July 17, 1888.

Application filed December 14, 1887. Serial No. 257,846. (No model.)

*To all whom it may concern:*

Be it known that I, HIRAM P. PRUIM, of Grand Haven, in the county of Ottawa and State of Michigan, have invented a new and Improved Nut-Lock, of which the following is a full, clear, and exact description.

This invention relates to an improvement in nut-locks, and has for its object to provide a nut-lock which will securely hold a nut upon a bolt.

This invention consists in a nut-lock constructed and arranged as hereinafter described and claimed.

Reference is to be had to the accompanying drawings, forming a part of this specification, in which similar letters of reference indicate corresponding parts in all the figures.

Figure 1:
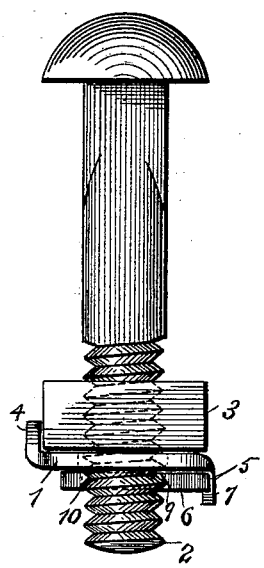
Figure 2:
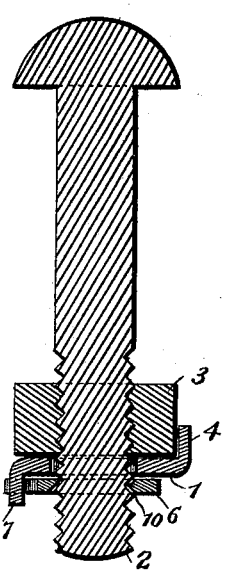
Figure 3:
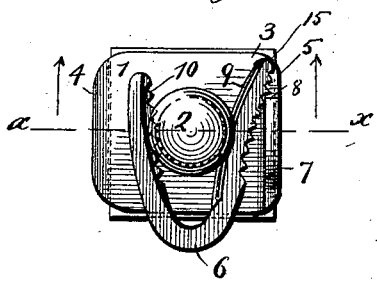
Figure 4:
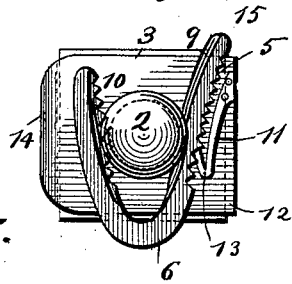
Figure 5:
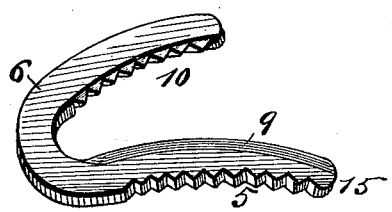

Figure 1 represents a bolt and nut with the lock applied. Fig. 2 is a vertical section on the line *x x* of Fig. 3. Fig. 3 is a plan view of Fig. 1. Fig. 4 is a plan view showing a modification, and Fig. 5 is a detail view of the locking-key.

It is well known that in certain locations—such as bridge-fastenings and rail-joints—nuts are liable to become loosened and shaken off. To obviate this various devices have been employed to keep the nuts in place. This invention, having the same object in view, contemplates the use of a peculiarly-constructed washer and locking-pin with a nut, whereby the nut is prevented from becoming loosened on its bolt.

In carrying out this invention a washer, 1, is employed, which is slipped onto a bolt, 2, against a nut, 3, after the latter has been screwed up to the desired position on the bolt 2 and tightened. The washer 1 is formed with a lip, 4, which is adapted to lie against one side of the nut, and with a suitable projection, to catch with which the teeth or serrated edge 5 of a V-shaped spring-key, 6, is adapted to engage. As shown in Fig. 3, the projection to catch consists of a rib or bent-up lip, 7, preferably cut off or terminating short of the corner of washer 1, to form an angular shoulder, 8, for the teeth 5 to engage with. The shoulder 8 may, however, be located at the corner of the washer. The inner portion of key 6 is formed with a beveled edge, 9, to fit between the threads of the bolt 2, and with a serrated edge or teeth, 10, beveled to fit between the threads of the bolt. The teeth 10 aid in retaining the key on bolt 2.

If desired, the spring clamp or key 6 may be formed with a serrated edge on the outside of its arm, having teeth 10, whereby it is adapted for a left-hand nut.

In operation, after the washer 1 has been pushed onto the bolt 2 against nut 3 and the lip 4 lies against the side of the nut, the key 6 is slipped over the bolt 2, and by means of its spring action firmly seats itself on the bolt, its teeth 5 riding over the shoulder 8 until the key is seated, when one of the teeth 5 engages the shoulder 8. The teeth 10, which have also slipped over the bolt 2 when the key is being seated, by means of their serrated surface, serve to retain the key in place. The lock having been secured in place, any jar of the nut will fail to turn it on the bolt, as it will be held by the lock.

In the modification in Fig. 4, instead of the lip 7, with shoulder 8, a spring arm or projection, 11, may be employed. In the instance shown it consists of an arm riveted to the washer 12 and projecting inward in an inclined direction, with a bent end, 13, adapted to engage the teeth 5 of key 6. Instead of the arm 11 being riveted to washer 12, it may be integral therewith, or formed thereon in any other suitable way. The washer 12 is formed with a retaining-lip, 14, for the nut, as in the device in Fig. 1. By means of the spring-arm 11 the key may be more readily engaged with the washer and released from locked position. In either form the key may be released by striking its end 15 to drive it back and away from engagement with washer and bolt. The construction, location, and arrangement of parts in this nut-lock are such as to preclude any loosening of the device and insure a perfect and durable nut-lock.

Having thus described my invention, what I claim as new, and desire to secure by Letters Patent, is—

1. In a nut-lock as herein described, the combination, with a nut and bolt, of a washer having a projection engaging the nut, and a V-shaped key engaging the bolt and a projection on the washer, substantially as described.

2. In a nut-lock, the combination, with a nut and bolt, of a washer having a lip bent up and resting against the side of the nut, and a V-shaped key straddling the bolt and having a serrated edge engaging a spring projection on the washer, substantially as described.

3. The combination, with bolt 2 and nut 3, of washer 12, having bent-up lip 14 and spring-arm 11, and the V-shaped key 6, having serrated edges 5 and 10 and beveled edge 9, substantially as described.

4. In a nut-lock as herein described, the combination, with a nut and bolt and a washer having a projection adapted to lie against the side of the nut and a projection adapted to engage a key, of a V-shaped key having an outer serrated edge to engage the washer and an inner beveled edge and a serrated edge to engage the bolt, substantially as described.

5. The V-shaped key 6, having serrated edge 5, beveled edge 9, and serrated edge 10, substantially as described.

HIRAM P. PRUIM.

Witnesses:
G. B. PARKS,
N. L. WATSON.